United States Patent [19]

Rebsamen et al.

[11] Patent Number: 4,545,179

[45] Date of Patent: Oct. 8, 1985

[54] METHOD AND APPARATUS FOR PRODUCING PACKAGES

[75] Inventors: August Rebsamen, Neuhausen am Rheinfall; Martin Löw, Löhningen, both of Switzerland

[73] Assignee: SIG Schweizerische Industrie-Gesellschaft, Neuhausen am Rheinfall, Switzerland

[21] Appl. No.: 532,056

[22] Filed: Sep. 14, 1983

[30] Foreign Application Priority Data

Sep. 16, 1982 [CH] Switzerland .......................... 5491/82

[51] Int. Cl.⁴ ...................... B65B 57/20; B65B 65/08; B65B 57/00
[52] U.S. Cl. ...................................... 53/443; 53/500; 53/501; 53/502; 53/504
[58] Field of Search ................. 53/443, 447, 501, 500, 53/502, 504, 507, 532, 540; 414/103

[56] References Cited

U.S. PATENT DOCUMENTS

| | | | |
|---|---|---|---|
| 3,846,958 | 11/1974 | Divan | 53/502 |
| 4,024,381 | 5/1977 | Fluck . | |
| 4,065,911 | 1/1978 | Fagan | 53/502 X |
| 4,136,504 | 1/1979 | Wyslotsky | 53/503 X |
| 4,141,442 | 2/1979 | Cole et al. | 53/502 X |
| 4,181,213 | 1/1980 | Deutschlander et al. . | |
| 4,209,960 | 7/1980 | Deutschländer et al. | 53/504 X |

FOREIGN PATENT DOCUMENTS 488593  5/1970  Switzerland .
527093 10/1972  Switzerland .

Primary Examiner—Horace M. Culver
Attorney, Agent, or Firm—Spencer & Frank

[57] ABSTRACT

A method of producing packages and an apparatus for implementing the method wherein each package contains a whole number of stackable objects which are conveyed in a row for packaging and the weight of each package is to remain within given limits. The method includes counting a number of contiguous objects in the row, forming groups of objects each having the counted number of objects, determining the length of each respective group in the direction of the row, bringing each respective group to a balance scale only if the group has a length within predetermined limits, measuring the weight of each respective group and rejecting a group if its weights lies below a given weight value.

8 Claims, 1 Drawing Figure

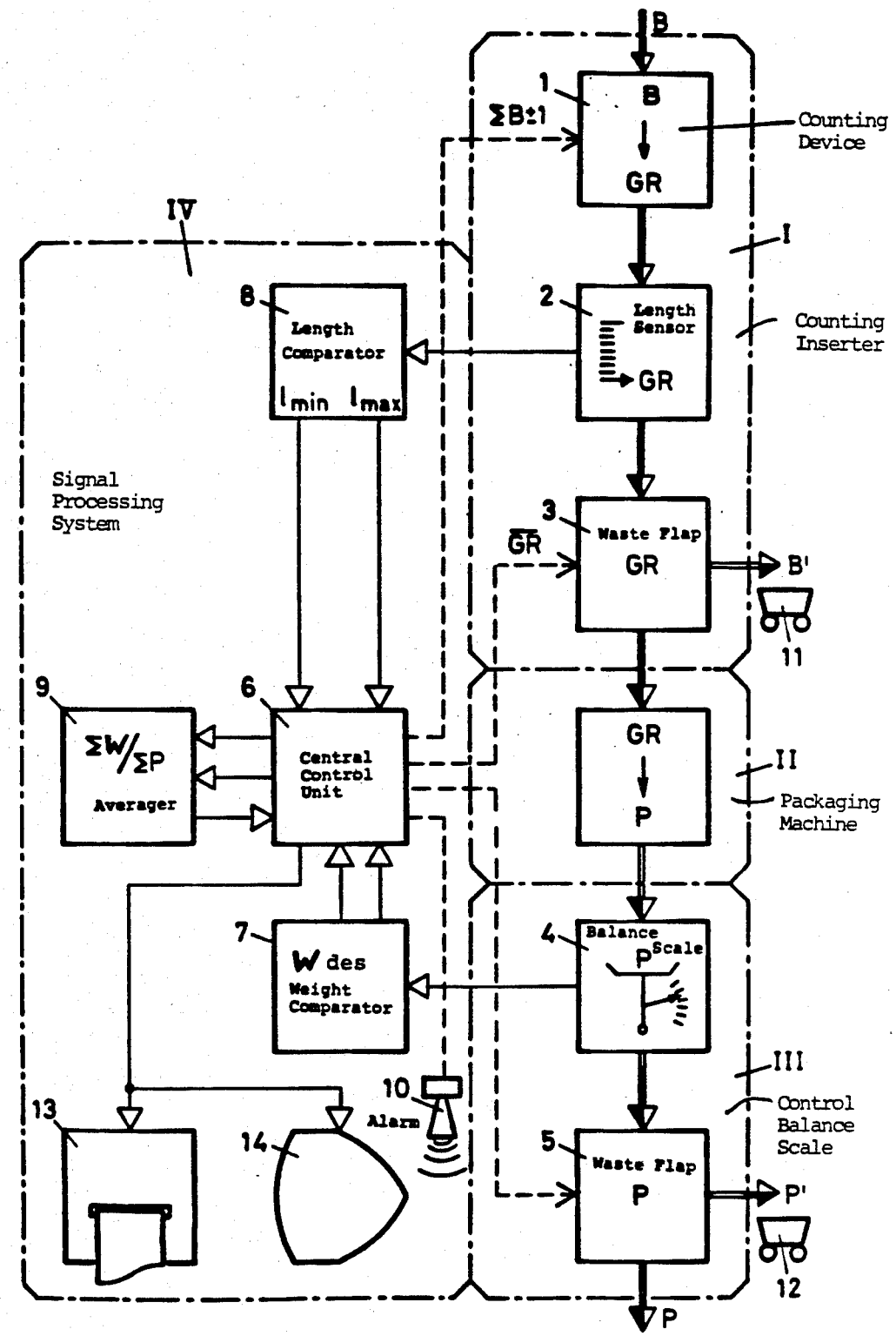

METHOD AND APPARATUS FOR PRODUCING PACKAGES

BACKGROUND OF THE INVENTION

The present invention relates to a method for producing packages wherein each package contains a whole number of stackable, similar objects and the weight of each package is to remain within given weight limits. The present invention also relates to a system for implementing the above method.

In connection with automatic packaging machines it is known to initially align in parallel with one another or in parallel rows objects, such as cookies, coming from an oven or other discharge point. These objects may be counted and grouped into stacks or rows for subsequent packaging. An example of a known counting and inserting apparatus is disclosed in U.S. Pat. No. 4,181,213. Counting devices per se are disclosed in Swiss Pat. No. 527,093 and in U.S. Pat. No. 4,024,381. Swiss Pat. No. 488,593 discloses a known aligning device.

For marketing reasons no underweight packages are permitted, and if possible, the same number of objects should be contained in every package. However, this condition has the result that weight is given away, i.e. the consumer often receives more than he pays for. The difference must be considered in the costs.

SUMMARY OF THE INVENTION

It is an object of the present invention to solve the problem of excess weight of which the consumer does not pay.

This is accomplished by the present invention with a method for producing packages wherein each package contains a whole number of stackable, similar objects which are conveyed in a row for packaging and the weight of each package is to remain within given limits. The method includes counting a number of contiguous objects in the row, forming groups of objects each having the counted number of objects, determining the length of each respective group in the direction of the row, bringing each respective group to a balance scale only if the group has a length within predetermined limits, measuring the weight of each respective group and rejecting a group if its weight lies below a given weight value.

An apparatus for implementing the method includes counting means for counting a number of contiguous objects in the row and forming groups of objects having the counted number of objects. The counting means includes setting means for setting the counted number of objects per group and a length sensor means for sensing the length of each group in the direction of the row and conveying a respective one of the groups for further processing whose length is within predetermined limits. A weighing means is disposed downstream of the counting means for weighing respective groups and rejecting a group if its weight is below a predetermined weight limit.

BRIEF DESCRIPTION OF THE DRAWINGS

The sole drawing FIGURE is a block diagram showing a system for producing packages according to the invention.

DESCRIPTION OF THE PREFERRED EMBODIMENT

As shown in the Figure, a counting and inserting apparatus I, including a counting device 1, a length sensor 2 and a waste flap 3, is arranged to receive stackable and nominally identical objects B and to convey groups GR of objects B. Length sensor 2 is commercially available and may comprise, for example, a Type RECTI H 25 length sensor which is obtainable from MCB, F-92404 Courbevoie, France.

A packaging machine II, which is a device known in the art, follows counting and inserting apparatus I. Each group GR of objects B is placed into a container and then encased in packaging material or may be encased directly in the packaging material supplied as an endless band in a manner well known in the art.

A control balance scale III, including a balance scale 4 and a waste flap 5, is arranged downstream of packaging machine II for receiving packages P therefrom.

A signal processing system IV is connected for controlling the processing stream. Signal processing system IV includes a central control unit 6, for example a computer with program memory and operating memory as is known in the art of information processing controls, a weight comparator 7, a length comparator 8, an average former 9 and an alarm generator 10.

Objects B enter counting and inserting apparatus I from the top, arrive in groups GR at packaging machine II and leave the latter as packages P. The flow of material from B to GR to P is shown in the Figure by arrows having half-solid tips and double stems.

Data lines in the Figure are shown as single lines with arrows having tips in the form of closed triangles and control lines are shown by dashed lines having open arrow tips. The flow of material from B to GR to P may be accomplished by a plurality of conveyor belts with material transfer locations as they are generally known in the packaging industry.

The apparatus operates as follows: objects B are transported, after alignment, separation and sorting out whole and broken articles, to counting device 1 where groups GR are formed which contain the same number of objects B. In counting device 1, an instruction signal $\Sigma B \pm 1$ from central control unit 6 can increase or decrease by one the number of objects B in the group. Then each group GR is measured in length sensor 2, i.e. the length of contiguous objects B in a row is measured. Data regarding the information "too short", "correct" or "too long" are generated in a length comparator 8 from the data received from length sensor 2 by comparison with a desired length and are fed to the central control unit 6. Here a decision is made whether packaging machine II requires the elimination of groups GR that are too short or too long and a control instruction $\overline{GR}$ actuates waste flap 3 to enable the discarding into a container 11 of a group GR formed by objects B' of an incorrect length.

After packaging groups GR in packaging machine II, packages P leave packaging machine II and reach a balance scale 4. Hence the precise weight W is determined and in a weight comparator 7 the gross weight is compared with a desired weight W des. If packages P' are underweight, central control unit 6 gives an instruction to waste flap 5 to sort out faulty packages P' into a container 12. Packages P containing a given number of objects B of the correct length and weight or with excess weight are discharged for shipping.

Of course, every manufacturer is interested in keeping the excess weight as low as possible. Signal processing system IV is therefore programmed such that the average weight $\Sigma W/\Sigma P$ of packages P and of rejected packages P' are combined. For this purpose, an average former 9 is provided. If the average weight $\Sigma W/\Sigma P$ has a difference from the desired weight, central control unit 6 may give a signal to counting device 1 to change the number of objects B that are to be combined in a group GR. If such a change does not produce an improvement or results in more waste, central control unit 6 causes alarm generator 10 to actuate an alarm so that the basic setting of the machine can be checked.

The data fed to the central control unit 6 or processed in it, could additionally be printed out by means of a data printer 13 and/or displayed in a data viewer 14.

It will be understood that the above description of the present invention is susceptible to various modifications, changes and adaptations, and the same are intended to be comprehended within the meaning and range of equivalents of the appended claims.

What is claimed is:

1. A method for producing packages wherein each package contains a whole number of stackable, similar objects which are conveyed in a row for packaging and the weight of each package is to remain within given limits, said method comprising:
    counting a number of contiguous objects in the row;
    forming groups of objects each having the counted number of objects;
    determining the length of each respective group in the direction of the row;
    bringing each respective group to a balance scale only if the group has a length within predetermined limits;
    measuring the weight of each respective group;
    rejecting a group if its weight lies below a given weight value; and
    packaging groups whose length is within the predetermined limits.

2. Method as defined in claim 1, wherein said step of packaging is performed in a packaging machine prior to said weighing step.

3. Method as defined in claim 1, and further including averaging the measured weight for a number of groups, and increasing or reducing the number of objects forming a group depending on whether the average weight lies outside predetermined lower and upper weight limits, respectively.

4. Method as defined in claim 3, and further including generating an alarm signal if a determination is made that a change in the number of objects forming a group did not lead to a correction which brings the average weight within the predetermined lower and upper weight limits.

5. A system for producing packages wherein each package contains a whole number of stackable, similar objects which are conveyed in a row for packaging and the weight of each package is to remain within given limits, said system comprising:
    counting means for counting a number of contiguous objects in the row and forming groups of objects having the counted number of objects, said counting means including setting means for setting the number of objects per group and a length sensor means for sensing the length of each group in the direction of the row and conveying a respective one of the groups for further processing whose length is within predetermined limits;
    weighing means disposed downstream of said counting means for weighing respective groups and rejecting a group if its weight is below a predetermined weight limit; and
    packaging means for packaging each group whose length is within the predetermined limits and whose weight is equal to or greater than the predetermined weight limit.

6. System as defined in claim 5, and further including a first waste flap means following said length sensor means for sorting out groups that are too long or too short, and a second waste flap means following said weighing means for discharging respective groups having a weight lower than the predetermined weight limit.

7. System as defined in claim 6, and further including a first signal generator connected to said length sensor means and generating a length signal; a second signal generator connected with said weighing means and generating a weight signal; and a signal processing system connected to said length sensor means and said weighing means for receiving the length signal and the weight signal, respectively, and connected to said setting means and to said first and second waste flap means, said signal processing means generatng a control signal which is coupled to said setting means for changing the number in said counting means and generating control signals each for actuating a respective one of said waste flap means.

8. System as defined in claim 7, wherein said signal processing system includes averaging means for forming an average weight for a given number of groups and logic means for making a decision regarding continuous processing with a changed number of articles per group or to generate an alarm signal depending on whether the average weight is within or outside, respectively, predetermined weight limits.

* * * * *